United States Patent
Denic et al.

(10) Patent No.: US 9,913,228 B2
(45) Date of Patent: Mar. 6, 2018

(54) ALLOCATING ENERGY RESOURCES IN A NETWORK SIGNALING NODE

(71) Applicant: KABUSHIKI KAISHA TOSHIBA, Tokyo (JP)

(72) Inventors: Stojan Denic, Bristol (GB); Mahesh Sooriyabandara, Bristol (GB); Stefanos Vatsikas, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 12 days.

(21) Appl. No.: 14/780,375

(22) PCT Filed: Mar. 28, 2013

(86) PCT No.: PCT/GB2013/050829
§ 371 (c)(1),
(2) Date: Sep. 25, 2015

(87) PCT Pub. No.: WO2014/155028
PCT Pub. Date: Oct. 2, 2014

(65) Prior Publication Data
US 2016/0044608 A1 Feb. 11, 2016

(51) Int. Cl.
*H04L 25/02* (2006.01)
*H04L 5/00* (2006.01)
(Continued)

(52) U.S. Cl.
CPC ........ *H04W 52/34* (2013.01); *H04B 7/15528* (2013.01); *H04W 52/0219* (2013.01); *Y02B 60/50* (2013.01)

(58) Field of Classification Search
CPC ............. H04L 25/0202; H04L 5/0048; H04W 72/0446; H04W 72/1289
(Continued)

(56) References Cited

U.S. PATENT DOCUMENTS 7,035,240 B1  4/2006  Balakrishnan et al.
7,934,107 B2  4/2011  Walrath
(Continued)

FOREIGN PATENT DOCUMENTS

EP  1 258 151 B1  10/2007
EP  1 942 600 A1  7/2008
(Continued)

OTHER PUBLICATIONS

International Preliminary Report on Patentability and Written Opinion issued by the International Bureau of WIPO dated Sep. 29, 2015, for International Application No. PCT/GB2013/050829.
(Continued)

*Primary Examiner* — Ronald B Abelson
(74) *Attorney, Agent, or Firm* — Finnegan, Henderson, Farabow, Garrett & Dunner, L.L.P.

(57) ABSTRACT

A method of allocating energy resources in a network signalling node during an interval of time the network signalling node having internal processing components for maintaining operation of the node and relaying components for relaying data between other nodes in the network. The method comprises determining an amount of energy available for use by the node during the interval, determining a willingness parameter that defines the willingness of the node to supply energy to the relaying components during the time interval, determining, based on the willingness parameter, a portion of the available energy to allocate to the internal processing components during the time interval; and allocating the remainder of the available energy to the relaying components.

19 Claims, 11 Drawing Sheets

(51) Int. Cl.
*H04W 72/04* (2009.01)
*H04W 72/12* (2009.01)
*H04W 52/34* (2009.01)
*H04W 52/02* (2009.01)
*H04B 7/155* (2006.01)

(58) Field of Classification Search
USPC .......................................................... 370/336
See application file for complete search history.

(56) References Cited

U.S. PATENT DOCUMENTS

| | | |
|---|---|---|
| 8,004,234 B2 | 8/2011 | Walrath |
| 8,140,876 B2 | 3/2012 | Arnold et al. |
| 8,255,716 B2 | 8/2012 | Mandyam |
| 2002/0071395 A1 | 6/2002 | Redi et al. |
| 2011/0208984 A1 | 8/2011 | Naware et al. |
| 2011/0248846 A1 | 10/2011 | Belov et al. |
| 2012/0072752 A1 | 3/2012 | Kennedy et al. |
| 2012/0210325 A1 | 8/2012 | de Lind van Wijngaarden et al. |
| 2015/0063183 A1 | 3/2015 | Nishioka |

FOREIGN PATENT DOCUMENTS

| | | |
|---|---|---|
| JP | 2012-49803 | 3/2012 |
| WO | WO 2008/032146 A2 | 3/2008 |
| WO | WO 2012/046866 A1 | 4/2012 |

OTHER PUBLICATIONS

Gorlatova et al., "Energy Harvesting Active Networked Tags (EnHants) for Ubiquitous Object Networking," IEEE Wireless Communications (Dec. 2010), pp. 18-25.

Madan et al., "Distributed Algorithms for Maximum Lifetime Routing in Wireless Sensor Networks," IEEE Transactions on Wireless Communications (Aug. 2006), 5:2185-93.

Mahmoud et al., "Credit-based Mechanism Protecting Multi-hop Wireless Networks from Rational and Irrational Packet Drop," IEEE Global Telecommunications Conference (May 2010), pp. 1-6.

Wang et al., "Network Lifetime Optimization in Wireless Sensor Networks," IEEE Journal on Selected Areas in Communications (Sep. 2010), 28:1127-37.

Chang et al., "Maximum Lifetime Routing in Wireless Sensor Networks," IEEE/ACM Transactions on Networking (Aug. 2004), 12:609-619.

Lee et al., "Analyzing Credit Evolution for Credit-based Incentive Schemes in Wireless Mesh Networks," IEEE Communications Society Conference (Jun. 2011), pp. 1-9.

| $p$ | 0.2 | 0.4 | 0.6 | 0.8 |
|---|---|---|---|---|
| $J_{opt}$[W] | 4.62 | 7.97 | 9.07 | 8.39 |
| $J_{mean}$[W] | 14.77 | 15.20 | 15.63 | 16.06 |

US 9,913,228 B2

ALLOCATING ENERGY RESOURCES IN A NETWORK SIGNALING NODE

CROSS-REFERENCE TO RELATED APPLICATION

This application is a national phase application of International Application No. PCT/GB2013/050829, filed Mar. 28, 2013, the content of which is incorporated herein by reference.

FIELD

Embodiments described herein relate generally to methods and devices for allocating energy resources in a network signaling node.

BACKGROUND

One of the most important features of power constrained wireless network devices is their lifetime, which in turn dictates the lifetime of the network. A wireless node's lifetime depends on how the node's available energy resources (for example, its battery capacity) are exploited during the node's operation.

Conventional approaches for increasing the lifetime of a wireless network are predominantly oriented to routing as a tool to improve the network lifetime, i.e. they determine routes which require the least energy for data transmission when each wireless node is allocated a certain amount of energy for communication. For example, the problem of network lifetime can be defined as a maximization problem in terms of routing. A heuristic approach may be used to solve the optimization problem, or alternatively, distributed algorithms may be considered. The network lifetime may also be addressed in an analytical fashion including cross-layer design factors.

Another approach for relaying strategies is credit-based or reputation-based relaying, where the decisions to forward another node's packet or to use another node to forward the node's own packets are based on some type of credit payments/receipts or reputation building. However, this type of system has a drawback in that a mechanism (i.e. Trusted Party) for keeping track of and enforcing the credit/reputation decisions is required.

It follows that there is a continuing need to optimise device operation and network design in order to maximize the network lifetime subject to the limited energy resources available to each node.

BRIEF DESCRIPTION OF FIGURES

Embodiments will now be described by way of example with reference to the accompanying drawings in which.

DETAILED DESCRIPTION

Figure 1:
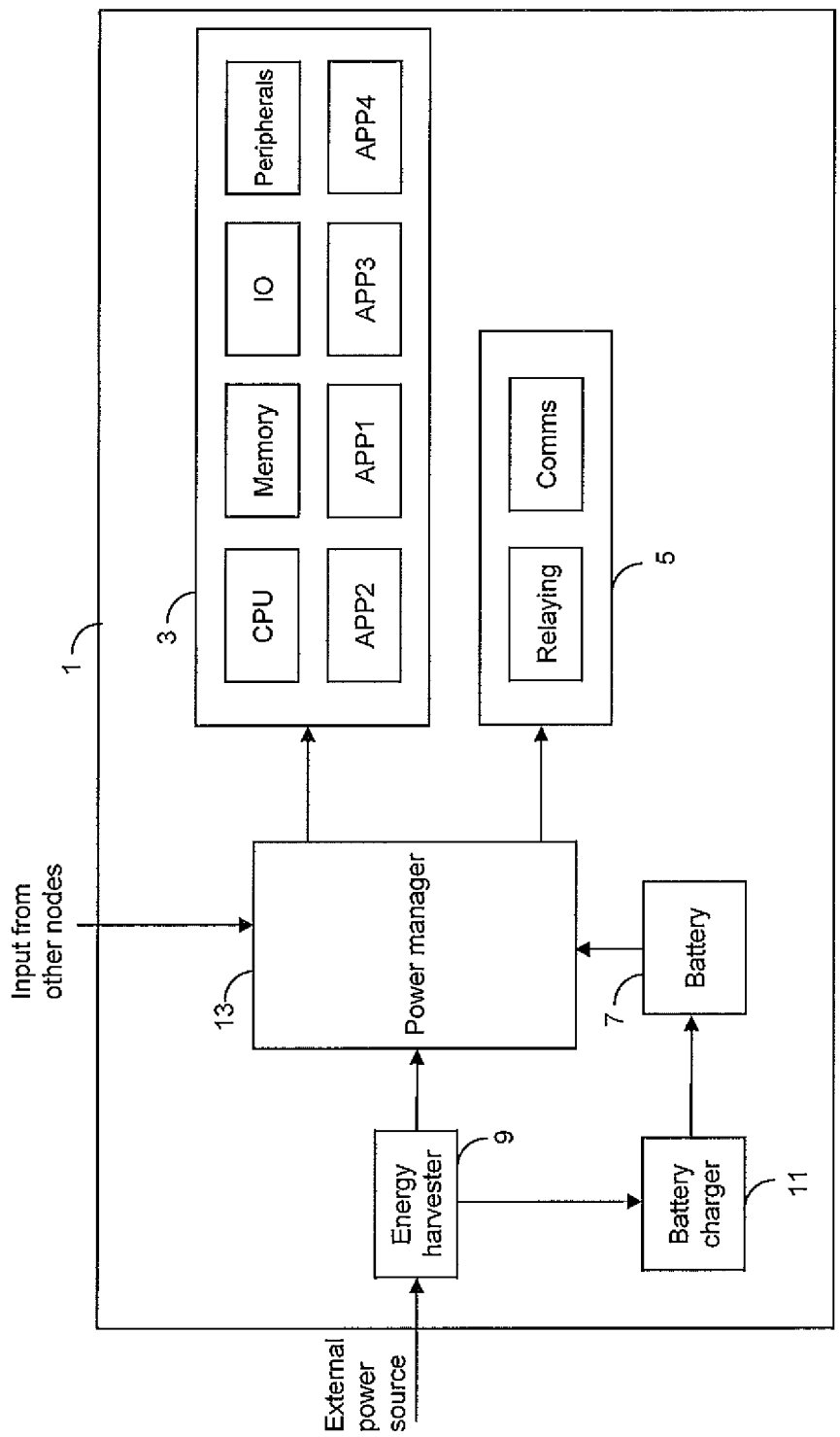
FIG. 1 shows a network signaling node including a power manager according to an embodiment.

A first embodiment described herein provides a method of allocating energy resources in a network signalling node during an interval of time, the network signalling node having internal processing components for maintaining operation of the node and relaying components for relaying data between other nodes in a network, the method comprising:
  determining an amount of energy available for use by the node during the interval;
  determining a willingness parameter that defines the willingness of the node to supply energy to the relaying components during the time interval;
  determining, based on the willingness parameter, a portion of the available energy to allocate to the internal processing components during the time interval; and
  allocating the remainder of the available energy to the relaying components.

The step of allocating a portion of the available energy to the internal processing components may comprise estimating the energy demand of the internal processing components during the interval. The energy demand may be estimated from a probability distribution of energy values, the distribution being compiled based on statistics of the node's energy usage in previous time intervals.

The amount of energy available may be determined based on the level of the node's internal energy resources at the start of the interval and an amount of energy estimated to be harvested by the node from external sources during the course of the interval.

In some embodiments, the willingness parameter is a constant whose value is determined based on one or more other input parameters. The one or more input parameters may be assigned respective weights. The willingness parameter may be determined by reference to the sum of the weighted input parameters. The one or more input parameters may include the amount of energy available to the node during the interval. The one or more input parameters may include data received from other nodes indicating the amount of power allocated by those nodes to their respective relaying components. The willingness parameter may be input manually by a user.

In some embodiments, the method comprises determining a reluctance parameter that defines the reluctance of the node to supply energy to the relaying components during the time interval, wherein the value of the willingness parameter increases as the value of the reluctance parameter decreases. The value of the reluctance parameter may be determined based on the one or more input parameters.

In some embodiments, the method comprises estimating the energy demand of the internal processing components during the interval, the energy demand being estimated from a probability distribution that is compiled using statistics of the node's energy usage in previous time intervals,
   wherein when the value of the reluctance parameter exceeds the value of the willingness parameter, the amount of energy allocated to the internal processing components exceeds the mean value of the probability distribution.
   The method may comprise;
   i) defining, as a first cost, the probability that an amount of energy allocated to the internal processing components will exceed the actual demand, and
   ii) defining as a second cost, the probability that the amount of energy allocated to the internal processing components will not meet the actual demand;
   iii) weighting the first cost by the willingness parameter;
   iv) weighting the second cost by the reluctance parameter;
   v) defining a cost function as a sum of the weighted costs; and
   vi) determining the amount of energy that when allocated to the internal processing components will minimise the cost function.

In some embodiments, the method comprises repeating steps i) to vi) for each one of a plurality of successive intervals. For each interval, the amount of energy that is available to the node at the start of the interval may be estimated based on the probability that the amount of energy allocated to the internal processing components in the previous interval will exceed the actual demand of the internal processing components in that previous interval. A new willingness parameter may be determined for each one of the intervals.

In some embodiments, the node is battery powered and the amount of energy available is determined by reference to the level of charge in the node's battery.

In some embodiments, the energy allocated to the internal processing components is prioritised amongst different processing tasks of the node.

A second embodiment described herein provides a power manager for allocating energy resources in a network signalling node during the course of an interval, the node having internal processing components for maintaining operation of the node and relaying components for relaying data between other nodes in a network, the power manager comprising:

an energy supply estimating module for determining an amount of energy available for use by the node during the interval;
a willingness determination unit configured to output a willingness parameter that defines the willingness of the node to supply energy to the relaying components during the time interval; and
a power distribution module configured to use the willingness parameter to determine a portion of the available energy to allocate to the internal processing components during the time interval;
the power distribution module being configured to allocate the remainder of the available energy to the relaying components.

The power manager may comprise an energy demand estimating module for estimating the energy demand of the internal processing components during the interval. The energy demand estimating module may be configured to compile a probability distribution of the energy demand based on statistics of the node's energy usage in previous time intervals.

The energy supply estimating module may be configured to determine the amount of energy available based on the level of the node's internal energy resources at the start of the interval and an amount of energy estimated to be harvested by the node from external sources during the course of the interval.

The willingness determination unit may be configured to determine the value of the willingness parameter based on one or more other input parameters. The one or more input parameters may be assigned respective weights and the willingness parameter may be determined by reference to the sum of the weighted input parameters. The one or more input parameters may include the amount of energy available to the node during the interval. The one or more input parameters may include data received from other nodes indicating the amount of power allocated by those nodes to their respective relaying components. The willingness parameter may be input manually by a user.

In some embodiments, the willingness determination unit is further configured to determine a reluctance parameter that defines the reluctance of the node to supply energy to the relaying components during the time interval, wherein the value of the willingness parameter increases as the value of the reluctance parameter decreases. The value of the reluctance parameter may be determined based on the one or more input parameters.

In some embodiments, the power manager may comprise an energy demand estimating module for estimating the energy demand of the internal processing components during the interval, the energy demand estimating module being configured to compile a probability distribution of the energy demand based on statistics of the node's energy usage in previous time intervals, and the power distribution module may be configured such that, when the value of the reluctance parameter exceeds the value of the willingness parameter, the amount of energy allocated to the internal processing components exceeds the mean value of the probability distribution.

In some embodiments, the power distribution module is configured to:
   i) define, as a first cost, the probability that an amount of energy allocated to the internal processing components will exceed the actual demand, and
   ii) define as a second cost, the probability that the amount of energy allocated to the internal processing components will not meet the actual demand;

iii) weight the first cost by the willingness parameter;
iv) weight the second cost by the reluctance parameter;
v) define a cost function as a sum of the weighted costs; and
vi) determine the amount of energy that when allocated to the internal processing components will minimise the cost function.

The power distribution module may be configured to repeat steps i) to vi) for each one of a plurality of successive intervals.

In some embodiments, the energy supply estimating module is configured to estimate the amount of energy available to the node at the start of each interval based on the probability that the amount of energy allocated to the internal processing components in the previous interval will exceed the actual demand of the internal processing components in that previous interval. The willingness determination unit may be configured to determine a new willingness parameter for each one of the intervals.

In some embodiments, the node is battery powered and the energy supply estimating unit is configured to estimate the amount of energy available by reference to the level of charge in the node's battery.

The power distribution unit may be further configured to prioritise the energy allocated to the internal processing components amongst different processing tasks of the node.

A third embodiment described herein provides a network signalling node comprising a power manager according to the second embodiment.

A fourth embodiment described herein provides a non-transitory computer readable storage medium storing computer executable instructions that when executed by a computer will cause the computer to carry out a method according to the first embodiment.

Embodiments described herein seek to balance the node's available energy resources (for example, its battery capacity) between various tasks that the node needs to perform. Balancing may be achieved by using basic notions of the inventory theory and assuming unselfishness of the nodes.

In some embodiments, the amount of energy allocated to the internal processing components may be determined by solving an optimization problem in the spirit of the inventory theory. In these embodiments, the solution of the optimization problem may be determined by considering profiles of the energy consumption for each node in the network. Alternatively, or in addition, the solution may be based on a combination of user preferences (in user operated devices), the current energy reserves (e.g. stored battery charge) and other nodes' behaviour. Through consideration of these factors, it is possible to optimise the amount of energy that should be dedicated to the node's own internal processing needs. The rest of the capacity ("unselfish" part) can be used for the relaying of packets of other nodes. The unselfish part that is injected into the network can improve the overall energy efficiency of the network and lead to the improvement of the network lifetime.

Is some embodiments, the node may comprise a device using a wireless interface. For example, the node may comprise a sensor, mobile phone, laptop, or tablet PC. The node may comprise part of a Wireless Sensor Network (WSN) or mesh network, where each node can relay information/messages originating from other nodes. Each node may report its status to other neighbouring nodes at certain predefined time moments.

In some embodiments, the nodes in the network may operate in a multi-cyclic fashion, whereby the nodes execute certain tasks periodically, over the course of several cycles. Within each cycle, the nodes may perform different tasks (including packet relaying), requiring a certain amount of energy. Each node in the network may have energy harvesting capabilities. The nodes may be self-reliant in terms of energy. During any given cycle, the node's energy resources may be replenished by energy harvesting, for example.

FIG. 1 shows a schematic of a wireless node 1 according to an embodiment. The node comprises various internal processing components 3 that are required to meet the specific needs of the node and/or which are used to support applications running on the node. These components include, for example, a computer processor CPU, components used in memory allocation as well as various peripheral devices (mouse, keyboard, for example) that may be connected to the node and which draw power from the node. In addition, the node also includes relaying components 5 that provide the node with the ability to relay data from other nodes in the network. These components may include e.g. one or more antennas, as well as hardware and/or software components for decoding/re-encoding incoming data, identifying message headers and retransmitting the data to other nodes in the network, for example.

Each of the various components must be supplied with energy in the form of electrical energy to function. In the present example, energy is supplied to the components from a battery 7. An energy harvester 9 may be used to periodically recharge the battery 7 by harvesting energy from an external source of power.

In order to ensure energy is distributed in an optimal fashion between the relaying components and the internal processing components, the node includes a power manager 13 that is operable to adjust the ratio of power provided to each set of components. Depending on various factors, including the amount of charge presently available in the battery, for example, the power manager may seek to conserve energy by reducing the power supplied to the relaying components in favour of the internal processing components. If the node has power to spare, the power manager may increase the energy supplied to the relaying components, thereby strengthening the wireless signal transmitted by the node and making it a more favourable choice for relaying data to and from other nodes in the network.

In addition to monitoring the amount of charge in the battery at any one time, the power manager may also receive data from the energy harvester, such that it is able to determine the overall energy available that will be available to the node over the course of a particular cycle (here the term "cycle" is used to signify an interval of predetermined duration). The power manager may also receive input from other nodes that can provide it with data concerning the overall routing capacity of nodes in the network.

Figure 2:
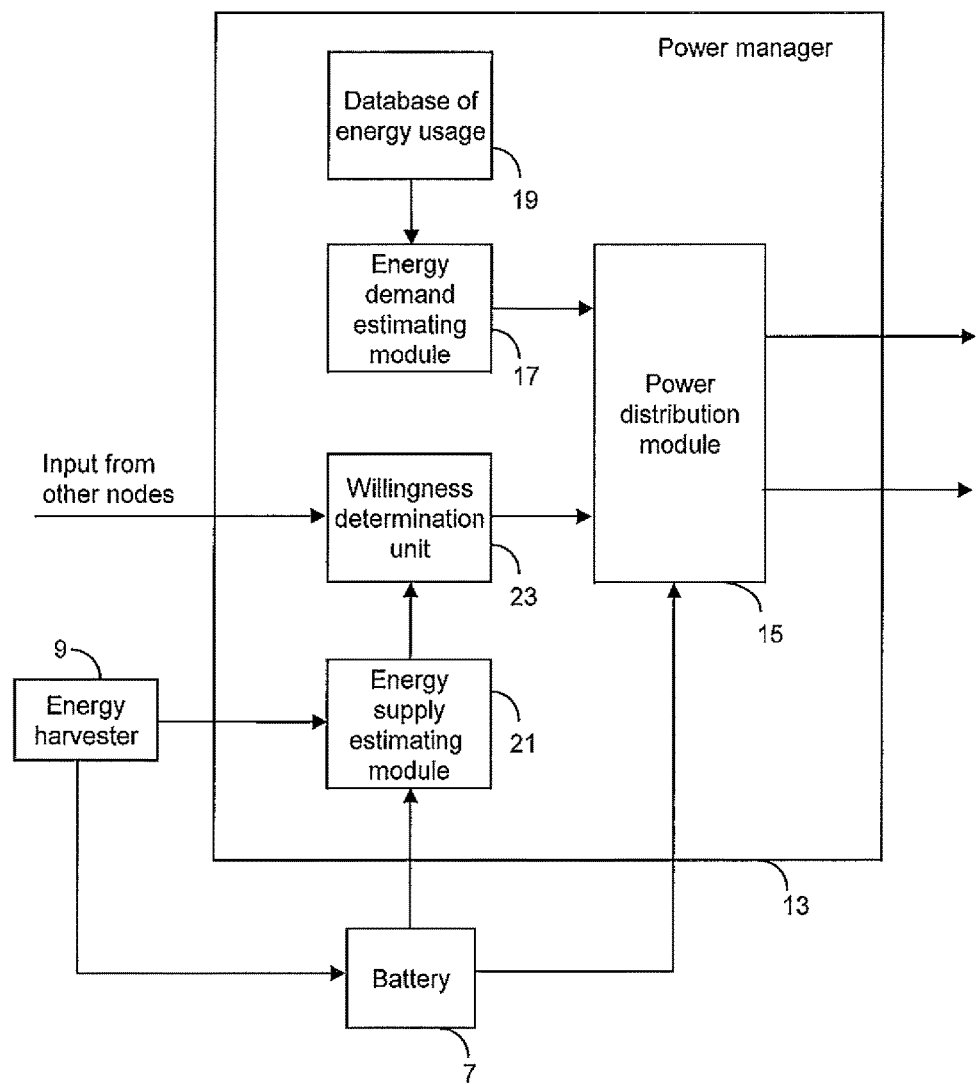
FIG. 2 shows the components of the power manager of FIG. 1 in more detail.

The function of the power manager 13 is explained in more detail with reference to FIG. 2. As shown in FIG. 2, the power manager 13 includes a power distribution module 15 that splits energy received from the battery between the relaying components and the internal processing components. In order to determine the ratio of the split, the power distribution receives input from several other modules, explained below.

A first module included in the power manager 13 is an energy demand estimating module 17 that is used to estimate the likely energy demand of the internal processing components during the course of the next cycle. In the present embodiment, the energy demand is estimated by consulting a database 19 that stores a record of the actual amount of energy used by the internal processing components in previous cycles (herein referred to as a "node profile"). The energy demand estimating module 17 may use the data from those previous cycles to construct a probability distribution, in which each value reflects the likelihood that the internal processing components will require a particular amount of energy during the cycle.

The power manager 13 further includes an energy supply estimating module 21 that is used to estimate the total energy available to the internal processing components and the relaying components over the course of the coming cycle. To do so, the energy supply estimating module monitors the amount of charge available in the battery 7, as well as monitoring the influx of energy from the energy harvester 9.

Also included within the power manager 13 is a willingness determination unit 23 that is used to evaluate the node's willingness to supply energy to the network. The willingness determination unit feeds data in the form of a willingness parameter into the power distribution module 15. The willingness parameter in turn may be used by the power distribution module 15 to bias the distribution of power either towards or away from the relaying components. For example, based on the willingness parameter, the power distribution module 15 may either increase or decrease the amount of energy supplied to the internal processing components beyond the mean energy demand as determined by the energy demand estimating module 17. The willingness determination unit may use a number of different inputs to calculate the willingness parameter; these inputs include, for example, the amount of energy actually available to the node as determined by the energy supply estimating module, as well as data received from other nodes concerning their own willingness to divert energy to relaying data in the network.

An embodiment will now be described for balancing the node battery capacity for a case in which the task performed by the node terminates after one inventory cycle.

Let B be the overall battery capacity of the wireless node. Denote by $B_u$ a portion of the battery dedicated towards the node's own internal processing needs and by $B_n$ a portion for the packet relaying. Therefore:

$$B = B_u + B_n \quad \text{(Equation 1)}$$

The task of the node is to optimally determine the two quantities $B_u$ and $B_n$. Two parameters are used as inputs for optimizing the relative magnitude of the quantities $B_u$ and $B_n$. These parameters are the "willingness parameter" and the "node profile," discussed below.

The willingness parameter is a node input parameter used to define the level of node's desire for collaboration in terms of other nodes' packet relaying. Based on the node's profile and the willingness parameter, an optimization problem is posed and solved giving the optimal sizes of two battery portions. The willingness parameter h defines the node's willingness to devote its energy to relaying other node packets. The willingness parameter is balanced by the level of importance of the node's own internal processing tasks as defined by a constant p, where:

$$h + p = 1 \quad \text{(Equation 2)}$$

It can be seen from this that the values of h and p will always offset one another; to this end, p can be defined as a "reluctance" parameter that defines the node's reluctance to devote energy to the network. The value of p will be determined by the decision strategy of the node. For example, the value of p can be determined by combining various parameters, such as current battery charge, energy harvesting patterns, user/operator preference and external input from neighbouring nodes. Low battery charge could require large values for p, as the node cannot afford to spend a lot of energy on relaying tasks. On the contrary, energy harvesting patterns that indicate frequent and sufficient levels of harvesting could allow lower values of p, as the node can afford to dedicate a large portion of energy to relaying tasks.

If external input from other nodes in the vicinity indicates that there exists a large number of nodes with low values of p (i.e. "unselfish"), then the node can in turn dedicate more energy to its own internal tasks. The user/operator preference can be attained by having the user/operator configure a relevant setting in the node's software/firmware that will enable the selfish/unselfish option for the node.

Figure 3:
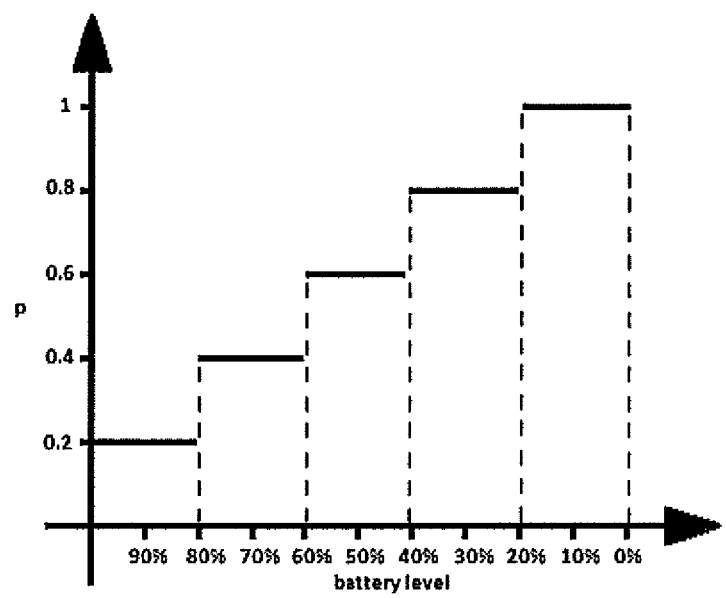
FIG. 3 shows an embodiment in which a willingness parameter varies according to a level of charge in a battery of the node.

The above multi-parameter method for determining the value of the willingness parameter is only an example. It is noted that, if a multi-parameter decision strategy for p is employed, each parameter can have a different weight, depending on the specific decision strategy:

$$p = \sum_i r_i \cdot p_i \quad \text{(Equation 3)}$$

where $p_i$ is the value of p suggested by the $i^{th}$ parameter and $r_i$ is the weight of this parameter. It is noted that $\Sigma_i r_i = 1$ and that the values of $r_i$ could be pre-programmed in the node's firmware. The value of each $p_i$ can be a function of the corresponding parameter, e.g. battery level. In this case, the value of the battery-related $p_i$ can be a step function with increasing values as the battery level decreases, i.e. the node becomes more selfish as its battery is depleted. This example is illustrated in FIG. 3.

In the case of external input from neighbouring nodes, one possibility is the use of a majority rule in order to determine the value of the relevant $p_i$. For example, if more than 50% of the nodes are "selfish" (i.e. p>0.5), then this node will opt for an "unselfish" $p_i<0.5$ and vice versa. In the case of user input, the value of p that is set by the user could override the rest of the $p_i$ values, or have its own $r_i$ weight (i.e. $r_i \neq 1$). In the simplest case, all $r_i$ will have the same value and all $p_i$ will be "binary" parameters (i.e. 0 or 1). The value of $p_i$ in this case will depend on the corresponding condition. For example, if battery level is below a pre-programmed threshold, the relevant $p_i$ will be 1 instead of 0; if more than 50% of the neighbouring nodes have p>0.5 (i.e. those neighbouring nodes are "selfish"), then the relevant $p_i$ for the present node will be set at 0 instead of 1. The above are only a few examples of decision strategies; the decision strategy for p can take many forms and even change over the lifetime of the network.

The node profile describes the typical behaviour in terms of energy usage of the node. The node profile can be built by computing the statistics of the node behaviour. For example, this can be achieved by logging the total power draw of the device over time, or by logging the power draw of individual tasks or classes of tasks or inter-arrival time of the tasks. The time scale of statistics gathering depends on the type of applications at hand, and it could widely vary, e.g. from seconds in the case of smart phones to several days in the case of the nodes in the sensor network.

The node profile may provide information concerning the amount of energy the node typically spends in performing one typical task. The amount of energy used to perform a task can be denoted by x, having a probability density function (pdf) f(x).

In the inventory theory vocabulary, the random variable x is called the demand. The value $B_u$ should be chosen to closely match the demand x. This matching depends on the expected excess defined by:

$$E_e = \int_0^{B_u} (B_u - x) f(x) dx \quad \text{(Equation 4)}$$

and the expected shortage $$E_S = \int_{B_u}^{\infty} (x - B_u) f(x) dx \quad \text{(Equation 5)}$$

Figure 4:
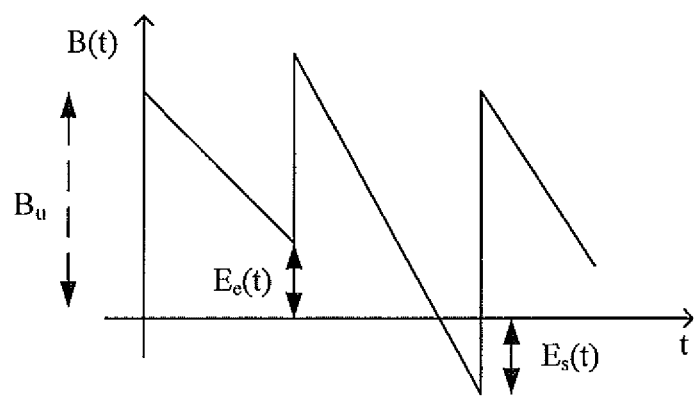
FIG. 4 shows an example of how energy consumption may vary in a network signaling node according to an embodiment.

If the node allocates $B_u$ energy units for the internal processing tasks ($B_u$ is often called the order level), and the actual demand x from the node is smaller than $B_u$, the node will, in effect, be allocating an excess amount of energy to the internal processing tasks. The excess energy allocated is represented by $E_e$ in Equation 4 above. Conversely, if the actual demand x from the node is larger than $B_u$, there will be a shortage of energy allocated, this shortage being represented by $E_s$ in Equation 5 above. This mathematical model of the energy (battery) consumption is shown in FIG. 4.

From the point of view of the node, a large $E_s$ is undesirable, whilst from the point of view of the network, a large $E_e$ would mean that the node has energy to spare that could otherwise be used for packet relaying.

To resolve this situation optimally, the parameters h and p are used, which put weight on both these energies. If the node decides to give larger priority towards the network task, it will set h>p, and vice versa. A cost function is defined as follows:

$$E[J] = hE_e + pE_s \quad \text{(Equation 6)}$$

where J is a cost, and E[J] is the expected cost. Substituting Equations 4 and 5 into Equation 6, the expected cost formula is $$E[J] = h \int_0^{B_u} (B_u - x) f(x) dx + p \int_{B_u}^{\infty} (x - B_u) f(x) dx \quad \text{(Equation 7)}$$

It can be seen from Equation 7 that the expected cost is a function of the chosen battery portion $B_u$. The cost can be minimized by taking the derivative with respect to $B_u$ giving:

$$F(B_u^0) = \frac{1}{1 + h/p} \quad \text{(Equation 8)}$$

where F(x) is the cumulative distribution function (cdf) of x. To determine $B_u^o$, one needs to find the inverse function of F(x) i.e.

$$B_u^0 = F^{-1}\left(\frac{1}{1 + h/p}\right) \quad \text{(Equation 9)}$$

It can be shown that the optimal value of $B_u$ is the smallest value of x for which the cumulative distribution function cdf F(x) is equal or larger than $$\frac{1}{1 + h/p}.$$

This threshold is equal to ½ when h=p. When the willingness parameter h is larger than p, $F(B_u^o) < ½$ and vice versa. In this way, the appropriate balancing is achieved between the node's needs and its willingness to cooperate.

Figure 5:
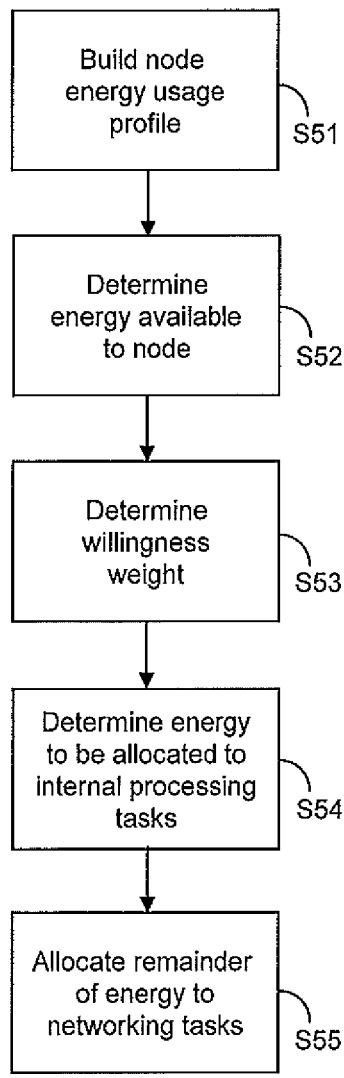
FIG. 5 shows a sequence of steps for allocating energy resources in a network signaling node according to an embodiment.

With reference to FIG. 5, the method for the wireless node battery capacity balancing according to the present embodiment can be summarized as follows:

1) Collect information during the node operation and build a node energy usage profile that describes the statistics of the node behaviour in terms of the energy consumption (step S51); this may include hardware and software components. In one instance, the profile can be represented by the pdf f(x) where x is the consumed energy.

2) Before the node operation, determine an amount of energy available to the node in the coming period (step S52).

3) Determine the value of the willingness parameter h based on current preferences (step S53).

4) Determine the optimal value of $$B_u^0 = F^{-1}\left(\frac{1}{1 + h/p}\right),$$

in order to allocate a portion of the available energy to the internal processing tasks (step S54).

5) Allocate the remaining part of the battery $B_n = B - B_u$ towards the relaying of the packets of the wireless network (step S55).

If there are multiple internal processing tasks to be performed, a further stage of energy optimisation may be implemented, whereby the energy $B_u^o$ allocated to the internal processing tasks is distributed between those tasks in order of their priority.

Figure 6:
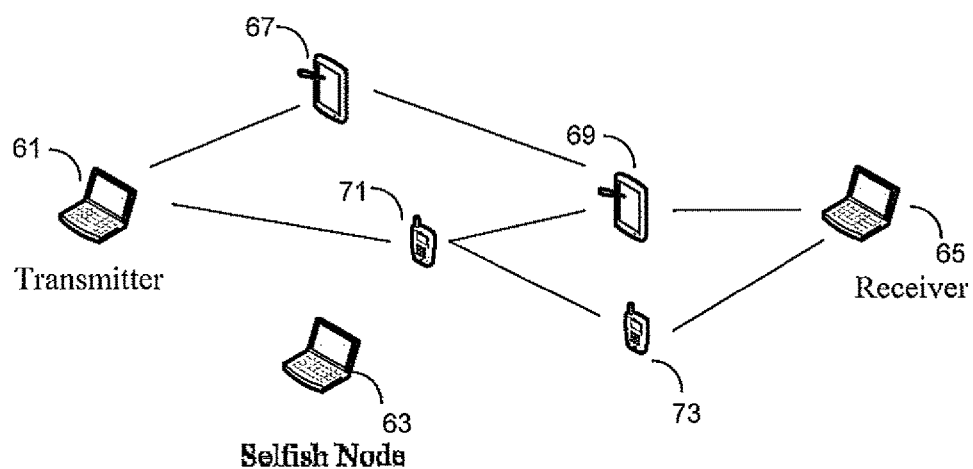
FIG. 6 shows a wireless signaling network comprising a conventional network signaling node.

FIG. 6 shows a wireless network consisting of 3 laptop computers 61, 63, 65, two tablet computers 67, 69 and two smart phones 71, 73. One laptop (the transmitter 61) desires to transmit a message to another laptop (the receiver 65). To do so, the transmitter 61 requires the use of intervening nodes that are willing to participate in the message relaying. The laptop 63 (a conventional laptop device) acts as one of the nodes in the network. In the example shown in FIG. 6, the laptop 63 makes no effort to determine an optimal balance between its own internal processing needs and those of the network; it simply acts in a selfish manner and does not offer to participate in the relaying of data between the transmitter laptop and the receiver laptop. In contrast, the other nodes 67, 69, 71, 73 are willing to cooperate and are able to offer an excess of energy for relaying.

Figure 7:
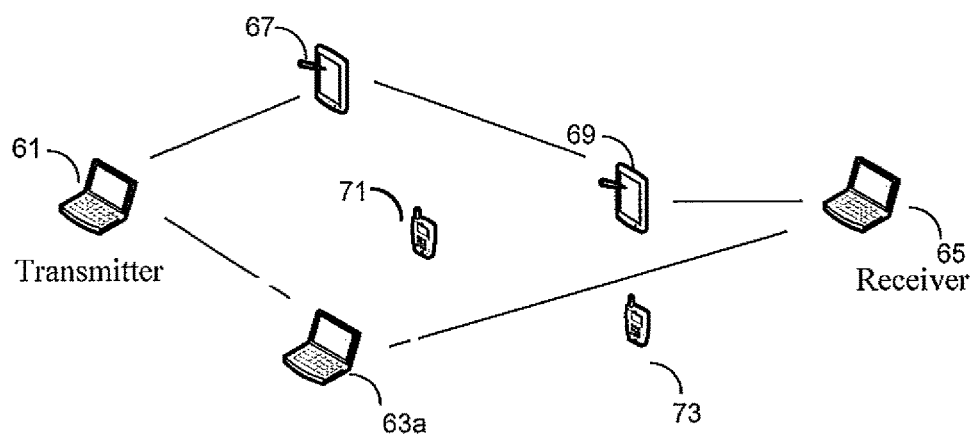
FIG. 7 shows a wireless signaling network comprising a network signaling node according to an embodiment.

FIG. 7 shows the network of FIG. 6 in which the conventional laptop node is replaced by a node (laptop 63a) according to an embodiment. Here, the laptop 63a is able to determine that a portion of its energy resources should be supplied to the relaying components, such that it can participate in relaying the message data between the transmitter and the receiver. The lifetime of the network overall is improved (due to the large battery of the laptop 63*a*) and the weak spots of the network (the smart phones) being removed from the relay chain. In addition, the network capacity and reliability may also increase since the larger device (the laptop) can use more powerful transmission techniques (e.g. better error-correction codes) than the smart phones as the laptop includes more processing power.

Figure 8:
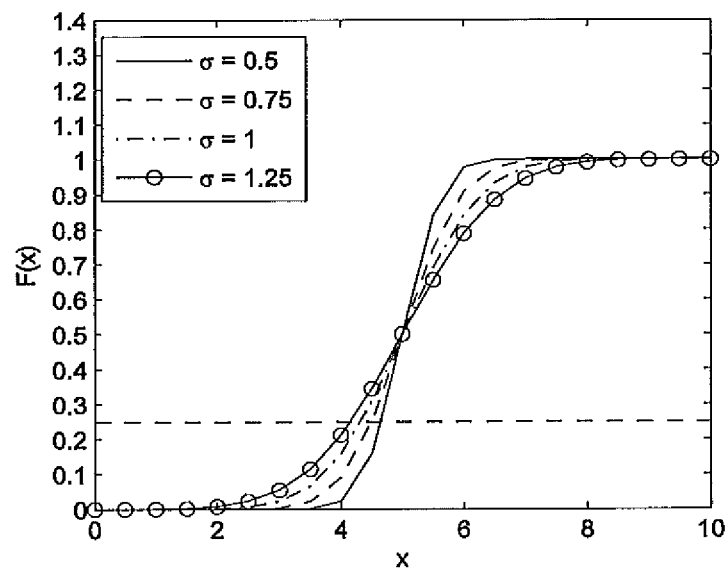
FIG. 8 shows a graph explaining how the energy allocated for carrying out an internal processing task in a network signaling node may vary depending on the expected energy demand for that task and the node's willingness to allocate energy to relaying components.

An example will now be presented in which the order level $B_u^o$ is determined when the node profile is modelled by a Gaussian pdf $f(x) \sim N(\mu=5, \sigma^2)$ where $\mu$ is the mean, and $\sigma$ is the standard deviation. Referring to FIG. 8, the quantity x represents an amount of energy needed for the operation of the wireless node for a typical task. If the willingness parameter h is set to 0.75, then p=0.25, meaning that a larger priority is given to relaying packets of the network than to the node's own internal processing tasks. Further, $F(B_u^o)$ =0.25, this threshold being shown as a dashed line in FIG. 8. The intersections of the threshold and the curves of the Gaussian cdf's determine the values of the abscissa x corresponding to $B_u^o$ for different values of $\sigma$. The larger the value of $\sigma$, the larger the difference between the mean value $\mu=5$ and $B_u^o$. Observe that when h=p, $\mu=B_u^o$.

Figure 9:
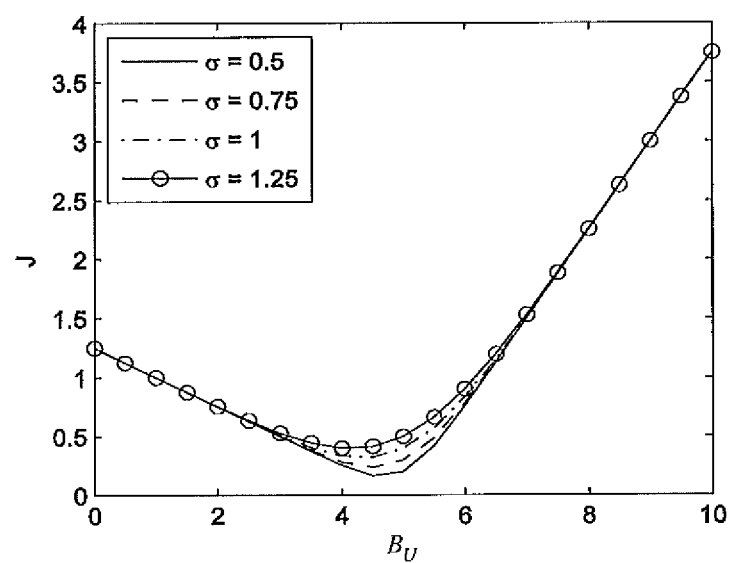
FIG. 9 shows a graph explaining how a cost to a wireless network lifetime varies depending on the energy allocated to the internal processing task in FIG. 7.
Figure 10:
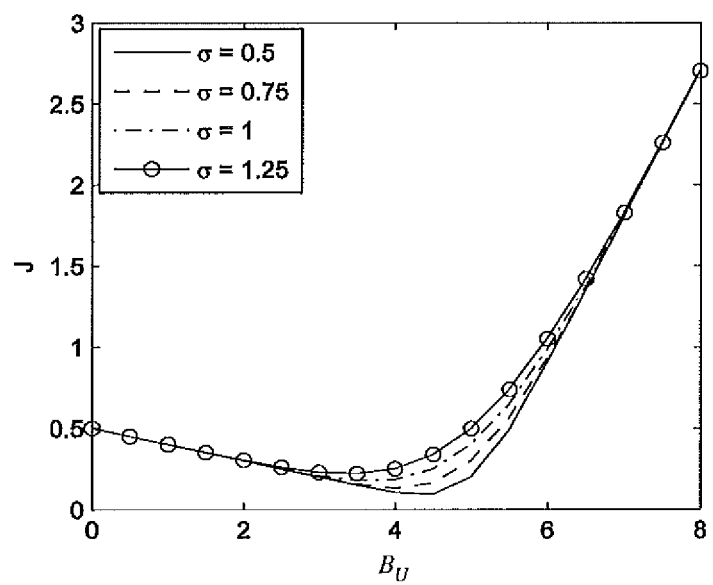
FIG. 10 shows a graph explaining how a cost to a wireless network lifetime varies depending on the energy allocated to the internal processing task in FIG. 7.

The same point can be seen also by realizing that the expected cost is the function of the order level $B_u^o$ as shown in the previous section. FIGS. 9 and 10 illustrate situations when h/p=3 and h/p=9, respectively. It can be observed that the expected cost is a convex function of the order level $B_u^o$ and that the minimum of the expected cost shifts to the left from the mean value $\mu=5$ as $\sigma$ increases. Also, these shifts are larger for larger value of h/p.

To see what gain can be obtained from the present embodiment, a node according to the present embodiment will be compared to nodes that use the mean value of the battery consumption p (as obtained from the node profile) to predict the consumption for their operation. (Note that, when the willingness parameter is not known, the mean value strategy is meaningful). Assume that the node of the present embodiment has an energy consumption modelled by a pdf $f(x) \sim N(\mu=5, \sigma^2)$ and apply the ratio h/p=3 as the input. From FIG. 8, it can be read that $B_u^o=4.32$ compared to $\mu=5$ for the mean value strategy. Thus, the node of the present embodiment will determine that it requires 13% less energy for its internal processing tasks than the conventional node. The energy saved can be directed towards the relaying components, thereby relieving the load on other nodes in the network. When h/p=9, then $B_u^o=3.72$ which represents 26% less energy usage for a node of the present embodiment. Thus, by appropriately choosing the willingness parameter parameter, the energy (battery) consumption can be optimally determined leading to an excess of the energy which can be used for the relaying packets of a wireless network.

If the smart phone battery capacity is 6 Wh (a reasonable assumption for smart phones today), and the node profile is modelled as in the example above ($f(x) \sim N(\mu=5$ Wh, $\sigma^2=1)$, h/p=3) then the energy allocated to the relaying components in a node of the present embodiment $B-B_u=6-4.32=1.68$ Wh=$B_n$ would be 68% larger from the case when the mean value strategy is used $B-B_u=6-5=1$ Wh=$B_n$. If all nodes in the network which relay the packets replace the mean value strategy with the method of the present embodiment, the lifetime of the network would improve by 68%. Precisely why this is the case can be understood by reference to FIGS. 11 to 13, which show a network of nodes used to relay data from a transmitter to a receiver. Here, the network lifetime is defined as a maximum length of a time interval during which the network can support a reliable transmission of data from the transmitter to the receiver. The network can use multiplexing both in frequency and time domain.

Figure 11:
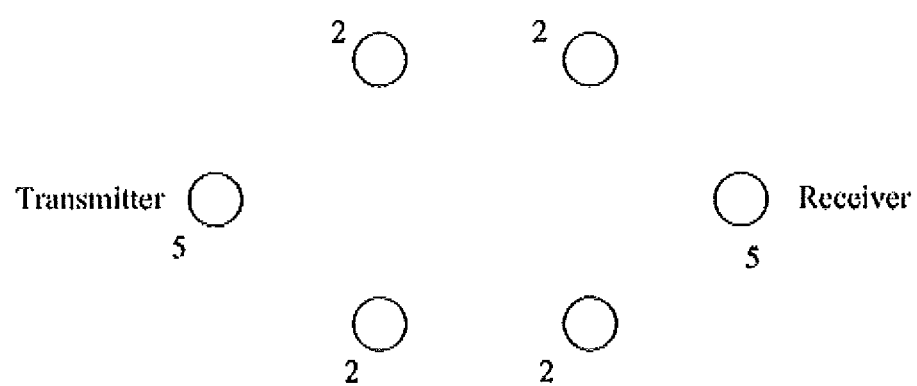
FIG. 11 shows a conventional wireless signaling network.
Figure 12:
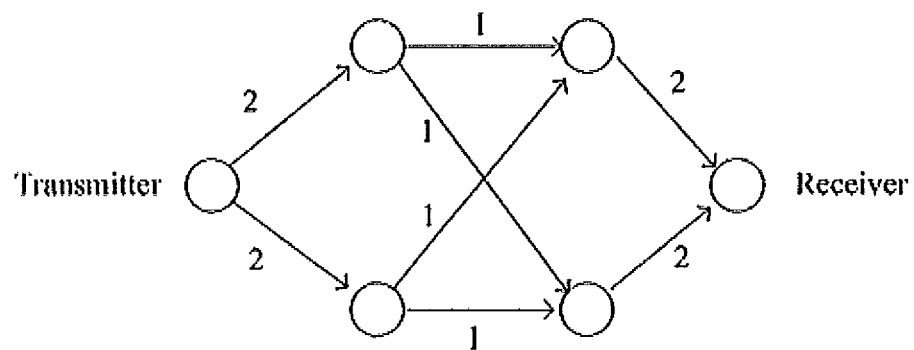
FIG. 12 shows a conventional wireless signaling network.
Figure 13:
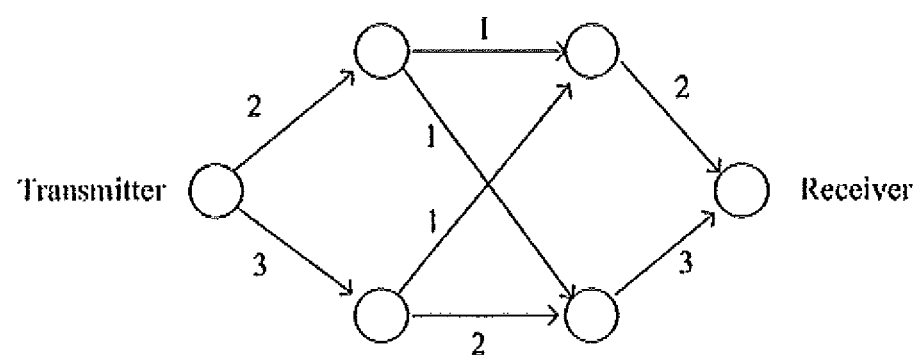
FIG. 13 shows a wireless signaling network according to an embodiment.

In the example network shown in FIGS. 11 to 13, the wireless network contains six nodes. Two of them act as a transmitter and receiver respectively, while the rest relay the packets. Each node has an associated battery capacity. Note that the battery capacity is proportional to duration of the node operation time when the power of the node is constant. Based on the max-flow min-cut theorem it can be deduced that the network lifetime is equal to 4, since the maximum duration of the message that the network can support is 4. The explanation for this is as follows: when two or more edges emanate from a node, there are as many data flows transmitted from the node in time multiplexing fashion. Thus, an overall duration of the node operation is equal to the sum of flow durations. In the case shown in FIG. 12, the potential of the transmitting node is not fully exploited since its battery capacity is 5, and the network can support the lifetime of only 4 units. Now suppose that two nodes at the bottom of FIG. 12 increase their energy dedicated for the packet relaying by 50%, as shown in FIG. 13. Then enhanced network lifetime will improve from 4 to 5 or by 25% percent.

The above described embodiment treated a case in which the task performed by the node terminates after one inventory cycle. A second embodiment will now be described that may be used in wireless networks in which the nodes perform periodic (multi-cyclic) tasks during a long time interval, possibly in a remote environment where the node battery has to be recharged from some energy fluctuating source, e.g. energy harvesting method. The inventory cycle in this particular embodiment refers to the period of battery recharging from the harvesting resources. Thus, another important statistic could be the probability distribution of the fluctuating source of energy on which wireless network nodes rely upon. The present embodiment represents a logical extension of the previously described embodiment, although different optimization techniques will be employed.

As before, the quantities $B_u$ and $B_n$ are determined by reference to the willingness parameter and the node profile. In this instance, where one or more of the input parameters varies over the course of successive cycles, the value of p can be updated accordingly. For example, if the node is engaged in energy harvesting during a particular cycle, and that harvesting fails, the relevant factor $p_i$ (as defined in Equation 3) may become 1 instead of 0. In general, each node in the network will be able to update its own internal p value on an event-triggered basis. When the value of one of the parameters that affect the $p_i$ values changes or goes above/below a certain threshold, then the corresponding $p_i$ value can change accordingly; this will in turn affect the overall p value of the node. At certain points in time (e.g. before a new cycle begins), all nodes in the network may advertise their "internal" p value in a round-robin fashion. The first node will have to determine its internal p value without taking other nodes' p values into consideration and will then advertise it. The $2^{nd}$ node will then compute its internal p value based on its internal parameters and on the advertised p value of the $1^{st}$ node. After setting p, the $2^{nd}$ node will advertise it and the process will continue in the same fashion until all nodes have set their p values. If a new node joins the network between cycles, it will wait until the next cycle to participate in this process; until then it could have a moderate default p value. The above process, which could be performed in a number of different ways, implies the need for synchronization between the nodes. Practical issues, such as the reaching of remote nodes can be resolved in a number of ways, including the relaying of control and synchronisation messages apart from actual data messages. Others issues such as fairness among nodes (in the sense that the first node is free to choose its p value while the last must also consider all other nodes' p values) can be resolved by, for example, reversing the round-robin order. The stability of the network is not expected to be adversely affected by the above process, as each node has to wait its turn to set its internal p value and this happens only once for every balancing cycle.

In what follows, we will denote the energy demand at time k by $w_k$ whose probability distribution function (pdf) is $P_w$. A random variable $x_k$ is used to denote the energy available (usually in the battery) at time k for performing the internal processing task. This amount of energy is what remains from the previous cycle. Then, the energy available for the next cycle is $$x_{k+1} = x_k + u_k - w_k \quad \text{(Equation 10)}$$

where $u_k = B_u$ is the amount of energy dedicated to the internal processing task at the moment k obtained from other external resources such as harvesting. The optimization problem consists of choosing the sequence $\{u_k\}_{k \geq 0}$ to minimize the cost function:

$$J = E\left\{\sum_{k=0}^{N-1}(cu_k + r(x_k + u_k - w_k))\right\} \quad \text{(Equation 11)}$$

where:

$$r(x) = p \max(0, -x) + h \max(0, x) \quad \text{(Equation 12)}$$

As in the case of the previously described embodiment, a large p penalizes a shortage of energy ($E_s$), while large h penalizes an excess of energy ($E_e$). The remaining part of the battery $B - B_u = B - u_k = B_n$ is allocated to the task of the packet relaying.

Figure 14:
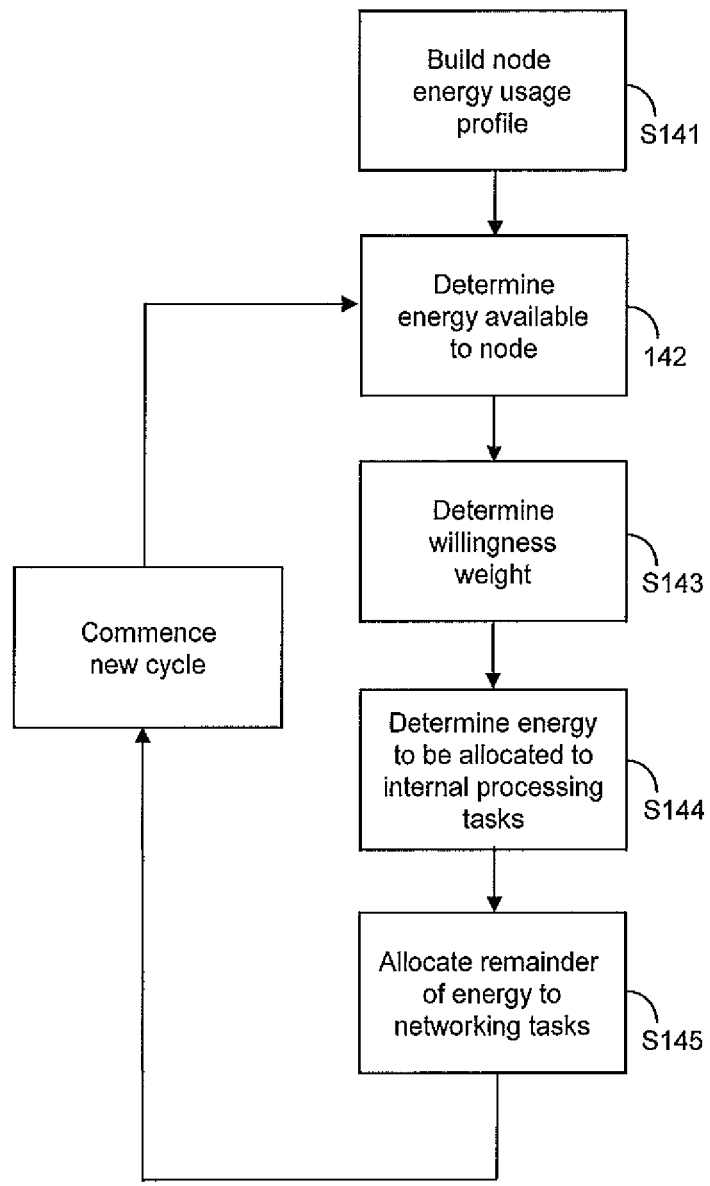
FIG. 14 shows a sequence of steps for allocating energy resources in a network signaling node according to an embodiment.

With reference to FIG. 14, the method for the wireless node battery capacity balancing of the present embodiment can be summarized as follows:

1) At each node, collect the internal information during the node operation and build the node profile which describes the statistics of the node's behaviour in terms of the energy consumption (step S141); this may include hardware and software components. In one instance, this profile can be represented by the pdf $P_w$ where $w_k$ is the energy demand for the internal node processing.
2) Before the node operation, determine an amount of energy available to the node in the coming period (step S142).
3) Determine the value of the willingness parameter h based on current preferences (step S143).
4) At each node, determine the optimal value of the battery capacity $B_u^o = u_k^o$ for the next cycle by solving the optimization problem (minimization of the cost function) and allocate the energy to the internal processing tasks (Step 144).
5) At each node, allocate the remaining part of the battery $B - B_u^o = B_n$ towards the relaying of the packets of the wireless network (Step 145).
6) Set k=k+1 and commence a new cycle Over the course of successive cycles, the value of p may be updated to suit the current operational parameters. This update can happen on an event-triggered basis (e.g. if the battery charge falls below set threshold). Updates may occur at the beginning of each cycle. For example, at the start of a new cycle, a first node in the network may transmit its p value to the "next" node, so that the next node can compute its own p value. This may continue until all nodes have computed their new p values.

As in the previously described embodiment, if there are multiple internal processing tasks to be performed in any given cycle, a further stage of energy optimisation may be implemented, whereby the energy $B_u^o$ allocated to the internal processing tasks in that cycle is distributed between those tasks in order of their priority.

Figures 15, 16:
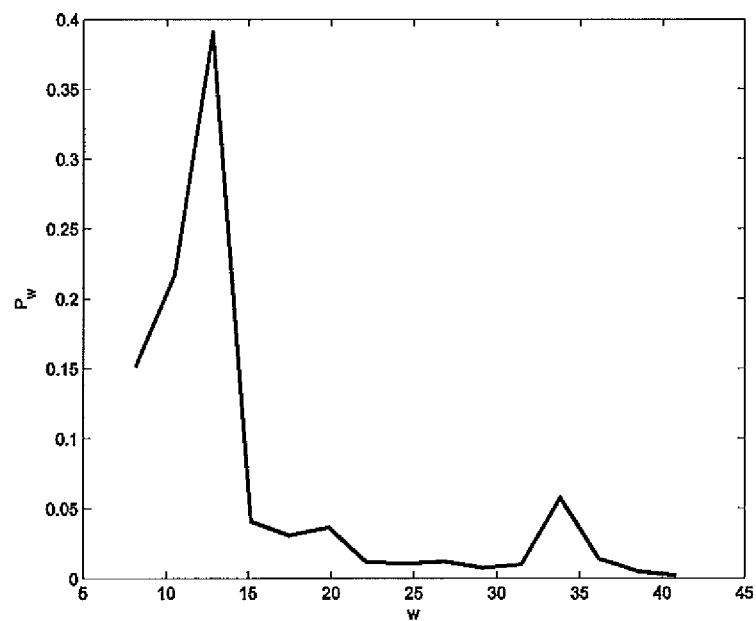
FIG. 15 shows a probability distribution for the energy consumption demand of a network signaling node according to an embodiment.
FIG. 16 shows a table comparing the cost to the wireless network lifetime when using a conventional method of allocating energy resources in a network signaling node and when using a method according to an embodiment.

To demonstrate the method of the present embodiment, we consider the case of a laptop computer whose energy consumption has been recorded during several weeks in lab conditions in order to determine an empirical probability distribution for the energy consumption demand $P_w$. FIG. 15 shows an example of such a probability distribution. In this example, the length of one cycle is set to one hour. This empirical distribution is used in the method to determine the optimal control sequence $\{u_k\}_{k \geq 0}$ representing the energy consumption dedicated to the internal processing task in the node. To solve the optimal inventory control problem, a dynamic programming approach is taken.

In this particular case, the number of the cycles is finite and is equal to N=5. In addition to the average cost function computed for the optimal control strategy $J_{OPT}$, the same quantity is computed for the so-called "mean" policy $J_{mean}$, which implies that $u_k = E[w]$ for every moment k, where $E[w]$ is the mean value of the random variable w. Here, the parameter c in Equation 11 is set to zero, so the cost captures the sum of the excess and shortage of the energy $E_e + E_s$. FIG. 16 shows a table comparing the cost for the two policies. It can be observed that the average optimal policy could have several times smaller cost than the "mean" policy.

Figure 17:
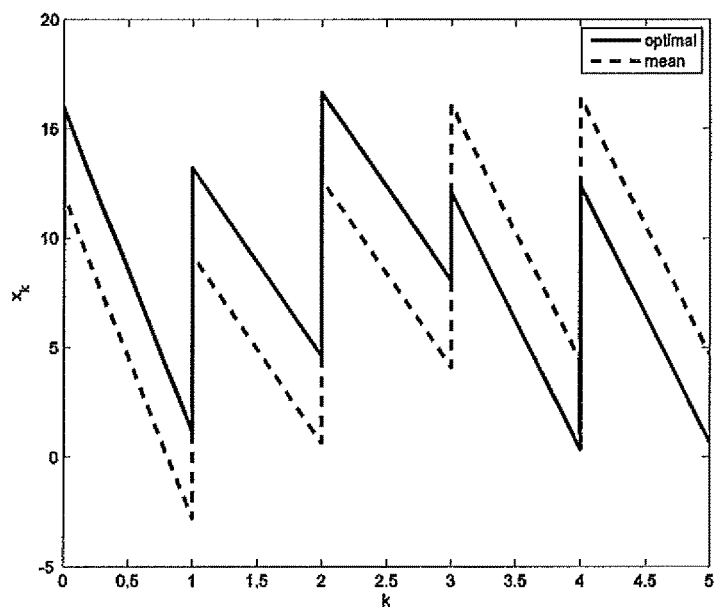
FIG. 17 shows a comparison between energy consumption in a network signaling node according to an embodiment and a conventional network signaling node.

Two realizations for the variable $x_k$ for the two policies when the time horizon is N=5, p=0.8 and h=0.2 are shown in FIG. 17 (for the purpose of this example, the values of p and h have been set "manually"). The choice of the parameter p suggests that the importance of the internal processing task is high, and accordingly, the importance of the relaying is secondary. Therefore, the optimal solution allows the excess of the energy, while the suboptimal solution is penalized for the shortage of the energy. This means that the "mean" policy would not provide sufficient energy for the internal processing execution in the first cycle.

Figure 18:
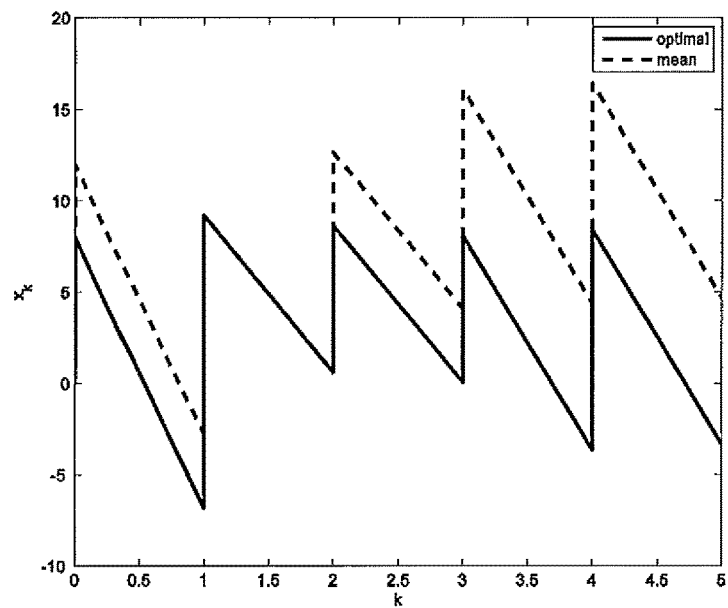
FIG. 18 shows a comparison between energy consumption in a network signaling node according to an embodiment and a conventional network signaling node.

The reverse situation is shown in FIG. 18. Here, p=0.2 and h=0.8 implying a high willingness to cooperate in packet relaying. It can be seen that the optimal policy allows for energy shortages for the internal processing tasks, while the mean policy is mostly in the positive energy range.

While certain embodiments have been described, these embodiments have been presented by way of example only, and are not intended to limit the scope of the invention. Indeed, the novel methods, devices and systems described herein may be embodied in a variety of forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

The invention claimed is:

1. A method of allocating energy resources in a network signalling node during an interval of time, the network signalling node having internal processing components for maintaining operation of the node and relaying components for relaying data between other nodes in the network, the method comprising:
   determining an amount of energy available for use by the node during the interval;
   determining a willingness parameter that defines the willingness of the node to supply energy to the relaying components during the time interval, wherein the willingness parameter is a constant whose value is determined based on one or more other input parameters, and the one or more input parameters include data received from other nodes indicating the amount of power allocated by those nodes to their respective relaying components;
   determining, based on the willingness parameter, a portion of the available energy to allocate to the internal processing components during the time interval; and
   allocating the remainder of the available energy to the relaying components.

2. A non-transitory computer readable storage medium storing computer executable instructions that when executed by a computer will cause the computer to carry out a method according to claim 1.

3. A power manager for allocating energy resources in a network signalling node during the course of an interval, the node having internal processing components for maintaining operation of the node and relaying components for relaying data between other nodes in a network, the power manager comprising:
   an energy supply estimating module for determining an amount of energy available for use by the node during the interval;
   a willingness determination unit configured to output a willingness parameter that defines the willingness of the node to supply energy to the relaying components during the time interval, wherein the willingness parameter is a constant whose value is determined based on one or more other input parameters, and the one or more input parameters include data received from other nodes indicating the amount of power allocated by those nodes to their respective relaying components; and
   a power distribution module configured to use the willingness parameter to determine a portion of the available energy to allocate to the internal processing components during the time interval;
   the power distribution module being configured to allocate the remainder of the available energy to the relaying components.

4. A power manager according to claim 3, further comprising an energy demand estimating module for estimating the energy demand of the internal processing components during the interval.

5. A power manager according to claim 4, wherein the energy demand estimating module is configured to compile a probability distribution of the energy demand based on statistics of the node's energy usage in previous time intervals.

6. A power manager according to claim 3, wherein the energy supply estimating module is configured to determine the amount of energy available based on the level of the node's internal energy resources at the start of the interval and an amount of energy estimated to be harvested by the node from external sources during the course of the interval.

7. A power manager according to claim 3, wherein the willingness determination unit is configured to determine the value of the willingness parameter based on the one or more other input parameters.

8. A power manager according to claim 7, wherein the one or more input parameters are assigned respective weights and the willingness parameter is determined by reference to the sum of the weighted input parameters.

9. A power manager according to claim 7 or 8, wherein the one or more input parameters include the amount of energy available to the node during the interval.

10. A power manager according to claim 7, wherein the willingness parameter is input manually by a user.

11. A power manager according to claim 7, wherein the willingness determination unit is further configured to determine a reluctance parameter that defines the reluctance of the node to supply energy to the relaying components during the time interval, wherein the value of the willingness parameter increases as the value of the reluctance parameter decreases.

12. A power manager according to claim 11, wherein the value of the reluctance parameter is determined based on the one or more input parameters.

13. A power manager according to claim 12, comprising an energy demand estimating module for estimating the energy demand of the internal processing components during the interval, the energy demand estimating module being configured to compile a probability distribution of the energy demand based on statistics of the node's energy usage in previous time intervals,
   wherein the power distribution module is configured such that, when the value of the reluctance parameter exceeds the value of the willingness parameter, the amount of energy allocated to the internal processing components exceeds the mean value of the probability distribution.

14. A power manager according to claim 13, wherein the power distribution module is configured to:
   i) define, as a first cost, the probability that an amount of energy allocated to the internal processing components will exceed the actual demand, and
   ii) define as a second cost, the probability that the amount of energy allocated to the internal processing components will not meet the actual demand;
   iii) weight the first cost by the willingness parameter;
   iv) weight the second cost by the reluctance parameter;
   v) define a cost function as a sum of the weighted costs; and
   vi) determine the amount of energy that when allocated to the internal processing components will minimise the cost function.

15. A power manager according to claim 14, wherein the power distribution module is configured to repeat steps i) to vi) for each one of a plurality of successive intervals.

16. A power manager according to claim 15, wherein the energy supply estimating module is configured to estimate the amount of energy available to the node at the start of each interval based on the probability that the amount of energy allocated to the internal processing components in the previous interval will exceed the actual demand of the internal processing components in that previous interval.

17. A power manager according to claim 14, wherein the willingness determination unit is configured to determine a new willingness parameter for each one of the intervals.

18. A power manager according to claim 3, wherein the node is battery powered and the energy supply estimating unit is configured to estimate the amount of energy available by reference to the level of charge in the node's battery;

and / or wherein the power distribution unit is further configured to prioritize the energy allocated to the internal processing components amongst different processing tasks of the node.

19. A network signalling node comprising a power manager according to claim 3.

* * * * *